(12) United States Patent
Oikawa

(10) Patent No.: US 10,953,853 B2
(45) Date of Patent: Mar. 23, 2021

(54) PHOTOGRAPHING APPARATUS FOR VEHICLE AND HEATING DEVICE

(71) Applicant: TOYOTA JIDOSHA KABUSHIKI KAISHA, Toyota (JP)

(72) Inventor: Yoshitaka Oikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 220 days.

(21) Appl. No.: 16/180,235

(22) Filed: Nov. 5, 2018

(65) Prior Publication Data

US 2019/0193684 A1 Jun. 27, 2019

(30) Foreign Application Priority Data

Dec. 27, 2017 (JP) .............................. JP2017-250544

(51) Int. Cl.
| | | |
|---|---|---|
| *H05B 1/02* | (2006.01) | |
| *B60S 1/02* | (2006.01) | |
| *B60R 11/04* | (2006.01) | |
| *B60S 1/08* | (2006.01) | |
| *B60R 11/00* | (2006.01) | |

(52) U.S. Cl.
CPC .............. *B60S 1/026* (2013.01); *B60R 11/04* (2013.01); *B60R 2011/0026* (2013.01); *B60S 1/0818* (2013.01); *B60S 1/0896* (2013.01)

(58) Field of Classification Search
CPC .......... H05B 1/02; H05B 1/1236; H05B 3/06; H05B 3/0042; B60S 1/026; B60S 2011/04; B60S 51/518; B60S 51/0896; B60R 1/04

USPC ....... 219/202, 203, 213, 494, 492, 497, 505, 219/536, 539, 541, 544
See application file for complete search history.

(56) References Cited

U.S. PATENT DOCUMENTS

| | | | |
|---|---|---|---|
| 7,731,373 B2 * | 6/2010 | Oskarsson | ........ B32B 17/10385 359/512 |
| 9,395,538 B2 * | 7/2016 | Hui | ........................ B60R 1/002 |
| 9,724,980 B2 * | 8/2017 | Hoke | ................... H05B 1/0236 |
| 9,913,319 B2 * | 3/2018 | Timmermann | .......... H05B 3/03 |
| 10,351,073 B2 * | 7/2019 | Usami | ..................... B60S 1/023 |
| 2011/0233248 A1 * | 9/2011 | Flemming | ............... B60R 11/02 224/482 |

(Continued)

FOREIGN PATENT DOCUMENTS

| | | |
|---|---|---|
| JP | 2017-185896 A | 10/2017 |
| JP | 2017-206098 A | 11/2017 |

*Primary Examiner* — Mark H Paschall
(74) *Attorney, Agent, or Firm* — Sughrue Mion, PLLC

(57) ABSTRACT

A photographing apparatus for vehicle includes a photographing apparatus, heating means, and a control device. The photographing apparatus is disposed inside a vehicle so as to face a window of the vehicle and is configured to receive photographing light passing through the window. The heating means is disposed inside the vehicle so as to face the window. The heating means generates heat that is given to the window when voltage of an electric power source of the vehicle is applied to the heating means. The control device changes voltage application time that is time period for applying the voltage of the electric power source to the heating means so that a total amount of heat generated by the heating means for a predetermined period of time is coincident with a predetermined amount determined based at least on an outside air temperature.

4 Claims, 11 Drawing Sheets

(56) References Cited

U.S. PATENT DOCUMENTS

| | | | |
|---|---|---|---|
| 2012/0234816 A1* | 9/2012 | Petrenko | H05B 1/0236 |
| | | | 219/203 |
| 2014/0083672 A1* | 3/2014 | Rollinson | B60H 1/00764 |
| | | | 165/202 |
| 2017/0295610 A1 | 10/2017 | Usami et al. | |
| 2017/0334364 A1 | 11/2017 | Usami et al. | |

* cited by examiner

PHOTOGRAPHING APPARATUS FOR VEHICLE AND HEATING DEVICE

BACKGROUND OF THE INVENTION

1. Field of the Invention

The present invention relates to a photographing apparatus for vehicle and a heating device which are, for example, provided behind a front window of a vehicle.

2. Description of the Related Art

A camera may be provided behind a front window of a vehicle. The camera converts reflected light (object image) reflected by an object (for example, a vehicle) positioned in front of the vehicle into imaging data (electric signal) by an image pickup device, and transmits the imaging data to a control device of the vehicle.

Incidentally, at low outside air temperature (i.e., temperature outside of the vehicle), when an air heating device is used inside the vehicle, dew condensation may be generated on the front window. Further, when the outside air temperature is low, ice and/or frost may adhere to the outer surface of the front window. When such a phenomenon occurs on the front window, an imaging data produced by the image pickup device of the camera may be data indicating a blurred object image, or the image pickup device may fail to capture an object in front of the vehicle.

Thus, a heater being a heating wire and a heated portion, which the heater is fixed to and gives heat received from the heater to the front window as radiation heat, are provided behind the front window of the vehicle (i.e., provided inside the vehicle) disclosed in Japanese Unexamined Patent Application Publication No. 2017-185896.

This heater is connected to an electric power source of the vehicle via electrical supply lines. When the electric power of the electric power source is supplied to the heater, the heater generates heat. The heated portion is heated by the heat generated by the heater, and the radiation heat generated by the heated portion is given to the front window. When the temperature of the heater becomes a value within a predetermined temperature range, the temperature of the front window becomes equal to or higher than the dew point temperature. As a result, the dew condensation occurring on the front window disappears. Furthermore, ice and frost adhering to the outside surface of the front window disappear.

Therefore, when the front window is heated by the heater and the heated portion, the risk that the image pickup device captures a blurred object image or fails to capture an object image can be reduced.

SUMMARY OF THE INVENTION

The outside air temperature has a correlation with the temperature of the front window which is heated by the heater. Therefore, the heat amount to be generated by the heater for a predetermined period of time, which is needed for making the temperature of the heater a value within the predetermined temperature range, can be calculated based on the outside air temperature.

Then, a time period for applying voltage to the heater can be calculated based on the heat amount to be generated by the heater.

However, the heater receives electricity from the electric power source of the vehicle. Since electricity of the electric power source is supplied to various electronic devices mounted in the vehicle, the magnitude of the voltage applied to the heater from the electric power source varies. Therefore, when the time period for applying voltage to the heater is controlled based only on the heat amount to be generated by the heater, depending on the magnitude of the voltage of the electric power source, the heat amount which is actually generated by the heater may greatly exceed the heat amount to be generated by the heater. In this case, since the temperature of the heater becomes excessively high, deformation of a component located in the vicinity of the heater may occur.

The present invention has been made in order to cope with the above-mentioned problem. That is, the present invention has an object to provide a photographing apparatus for vehicle and a heating device which can make a heat generation amount generated by heating means (for example, a heater) for a certain time approximately coincident with a target heat generation amount (for example, a heat generation amount determined on the basis of an outside air temperature) even when voltage of an electric power source which supplies electricity to the heating means varies.

In order to achieve the object, the photographing apparatus for vehicle according to the present invention comprises:

a photographing apparatus (30) that is disposed inside a vehicle so as to face a window (85) of the vehicle and is configured to receive photographing light passing through the window;

heating means (41a, 43b) that is disposed inside the vehicle so as to face the window, the heating means generating heat that is given to the window when voltage of an electric power source of the vehicle is applied to the heating means; and a control device (100) changing voltage application time that is time period for applying the voltage of the electric power source to the heating means so that a total amount of heat generated by the heating means for a predetermined period of time (T) is coincident with a predetermined amount determined based at least on an outside air temperature (Tair).

In order to achieve the object, the heating device (95) according to the present invention that is disposed inside a vehicle so as to face a window of the vehicle together with a photographing apparatus, the heating device comprises:

heating means (41a, 43b) generating heat that is given to the window when voltage of an electric power source of the vehicle is applied to the heating means; and a control device (100) changing voltage application time that is time period for applying the voltage of the electric power source to the heating means so that a total amount of heat generated by the heating means for a predetermined period of time (T) is coincident with a predetermined amount determined based at least on an outside air temperature.

The above "coincident with a predetermined amount" includes both "completely coincident with a predetermined amount" and "approximately coincident with a predetermined amount".

According to this aspect, the control device changes the voltage application time that is time period for applying the voltage to the heating means so that the heating means generates the predetermined amount of heat for the predetermined period of time regardless of the magnitude of the voltage of the electric power source. Therefore, it is possible to make the amount of heat generated by the heating means for the predetermined period of time approximately coincident with a targeted heat amount (i.e., a heat amount determined based on the outside air temperature).

In one of aspects of the present invention, the control device is configured to make the voltage application time shorter as the voltage of the electric power source becomes higher.

According to this aspect, when the voltage of the electric power source is large, the voltage application time becomes short, and when the voltage is small, the voltage application time becomes long. Further, when the voltage application time is not so long, the fluctuation range of the voltage in the voltage application time does not become too large. Therefore, when the voltage application time is not so long, the heating means can generate the predetermined amount of heat for the predetermined period of time regardless of the magnitude of the voltage.

In one of aspects of the present invention, the photographing apparatus for vehicle further comprises:

an outside air temperature detector (101) detecting the outside air temperature that is a temperature outside the vehicle; and a vehicle speed sensor (131) detecting a vehicle speed that is a speed of the vehicle.

The control device is configured to:

calculate a total amount of heat (E(t)) generated by the heating means from when the electric power source starts applying the voltage to the heating means based on the voltage of the electric power source; and stop applying the voltage of the electric power source to the heating means when the calculated total amount of heat reaches a target heat generation amount (Et) that is determined based on the detected outside air temperature and the detected vehicle speed.

According to this aspect, when the total amount of heat generated by the heating means reaches the target heat generation amount, the control device stops applying the voltage to the heating means. Therefore, the heating means can generate the predetermined amount of heat for the predetermined period of time.

In one of aspects of the present invention, the photographing apparatus for vehicle further comprises a voltage estimator (106) obtaining an estimated voltage value (Vp) that is an estimated value of the voltage of the electric power source based on magnitude of the voltage (Vc) applied from the electric power source to the photographing apparatus and a maximum value (Vrmax) of a voltage drop amount that can occur between the electric power source and the photographing apparatus.

The control device is configured to change the voltage application time that is the time period for applying the voltage of the electric power source to the heating means based on the estimated voltage value.

According to this aspect, a possibility that the heating means generates the predetermined amount of heat for the predetermined period of time becomes higher.

In the above description, names and references used in the following descriptions regarding embodiments are added with parentheses to the elements of the present invention, in order to understand the invention. However, those names and references should not be used to limit the scope of the present invention. Other objects, other features, and accompanying advantages of the present invention are easily understood from the description of embodiments of the present invention to be given referring to the following drawings.

DETAILED DESCRIPTION OF THE PREFERRED EMBODIMENTS

Hereinafter, a photographing apparatus for vehicle (including a heating device) according to an embodiment of the present invention will be described with reference to the accompanying drawings.

(Configuration)

Figure 1:
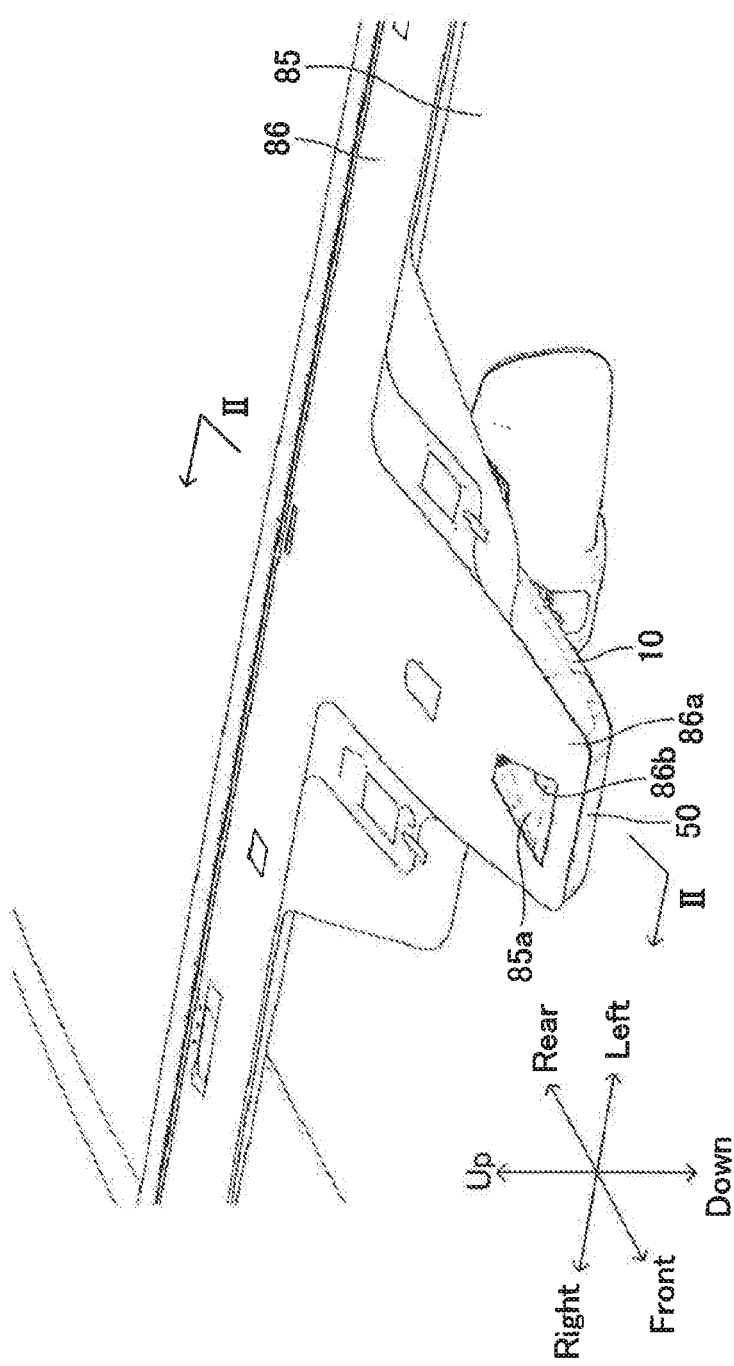
FIG. 1 is a perspective view of a photographing apparatus for vehicle and a front window according to an embodiment of the present invention as viewed from the front.
Figure 2:
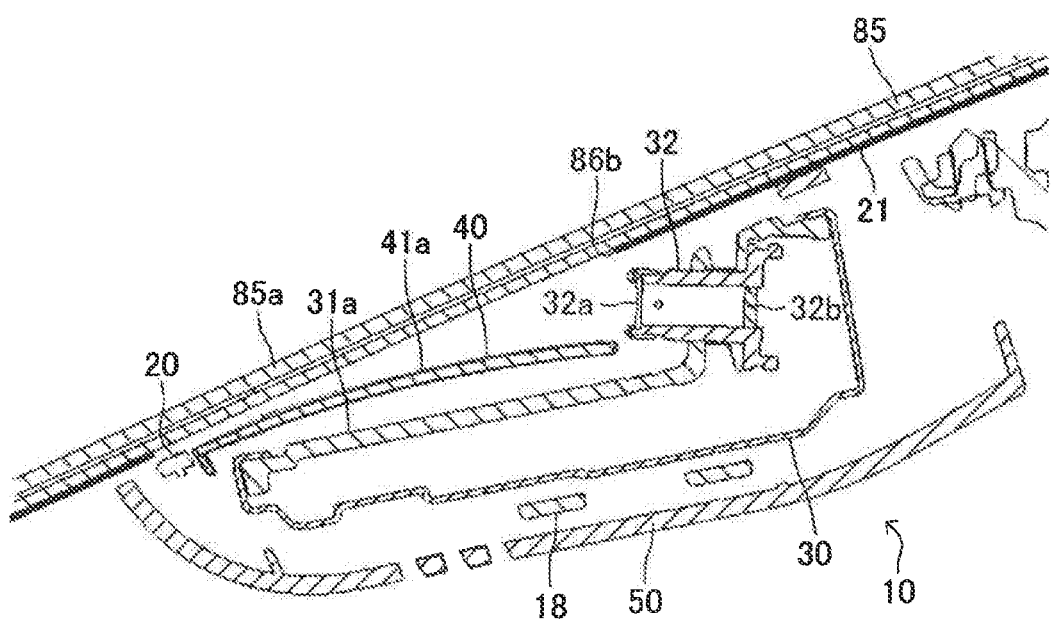
FIG. 2 is a cross-sectional view taken along line II-II in FIG. 1.

As shown in FIG. 1, a photographing apparatus for vehicle 10 (hereinafter referred to as a "photographing apparatus 10") according to the embodiment is provided behind a front window 85 of a vehicle (i.e., provided inside the vehicle). The front window 85 is made from translucent glass. The front window 85 may be made from a material (for example, resin) other than glass as long as it has translucency. As shown in FIG. 2, the front window 85 is inclined with respect to the vehicle body in such a manner that the front window 85 gradually heads toward the front of the vehicle as approaching the lower end thereof from the upper end thereof.

As shown in FIG. 1, a light shielding sheet 86 having a substantially T-shape in its entire shape is attached to an upper edge portion and its vicinity of the rear surface (that is, a surface on the vehicle interior side) of the front window 85. At the central portion of the light shielding sheet 86, a forward extending portion 86a extending forward and obliquely downward is formed. A light transmission hole 86b having a substantially trapezoidal shape is formed in the vicinity of the front end of the forward extending portion 86a. A portion of the front window 85 which faces the light transmission hole 86b is a light transmission portion 85a. The photographing apparatus 10 is provided behind the front window 85 (i.e., inside the vehicle) so as to face the light transmission portion 85a.

Figure 3:
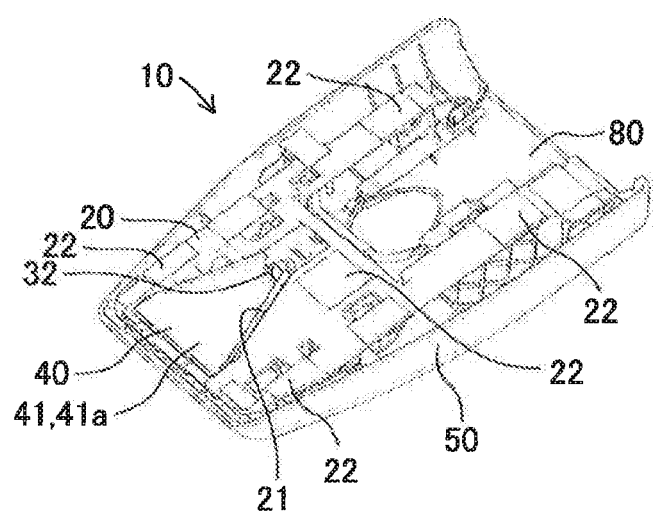
FIG. 3 is a perspective view of the photographing apparatus for vehicle as viewed from the above.
Figure 4:
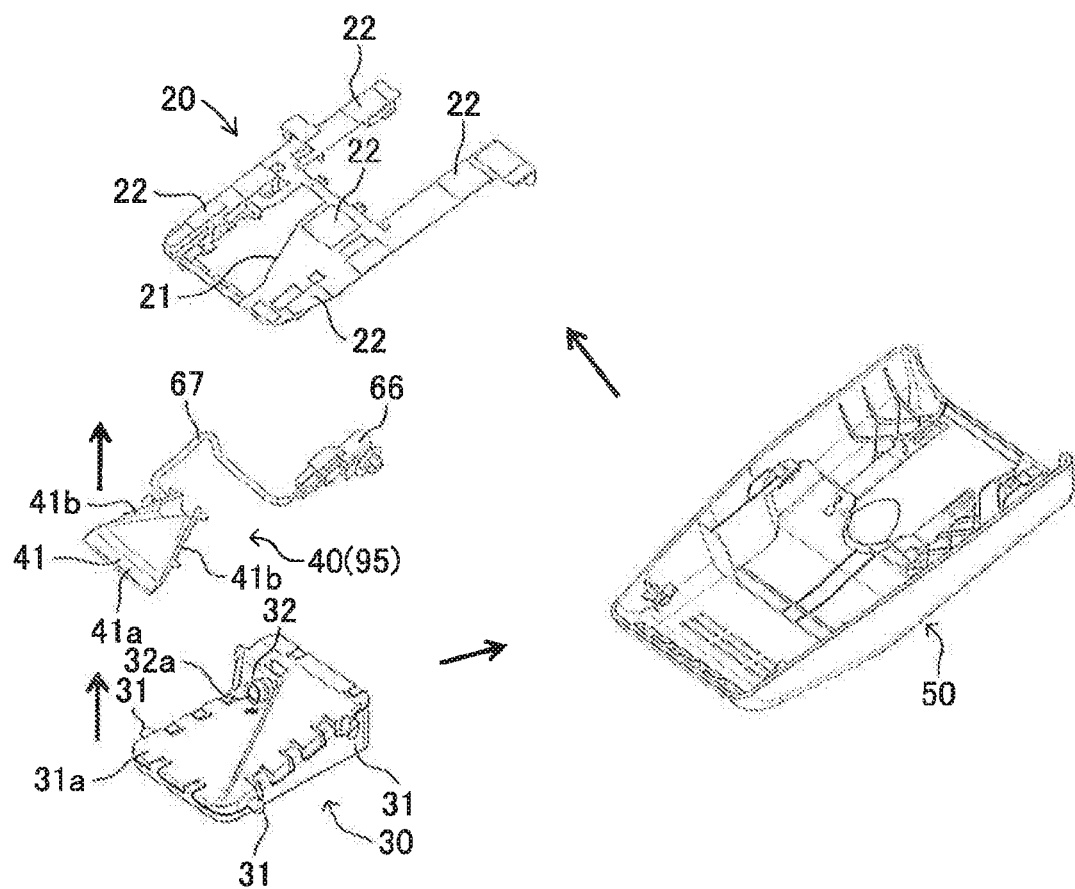
FIG. 4 is an exploded perspective view of the photographing apparatus for vehicle as viewed from the above.

As shown in FIGS. 3 and 4, the photographing apparatus 10 includes a bracket 20, a camera unit 30, a light shielding and heating unit 40, and a cover 50 as main components.

The bracket 20 is made from a hard resin. A support portion 21, which is substantially trapezoidal through hole, is formed in the bracket 20. Further, a plurality of adhesive surfaces 22 are formed on the upper surface of the bracket 20.

The camera unit 30 includes a housing 31 and an image pickup unit 32. The housing 31 is an integrally molded product made from resin and constitutes the outer shape of the camera unit 30. A hood mounting recess 31a having a substantially trapezoid shape in a plan view is formed on the upper surface of the housing 31. The image pickup unit 32 is fixed to the rear end surface of the hood mounting recess 31a. As shown in FIG. 2, the image pickup unit 32 includes a lens 32a and an image pickup device 32b positioned immediately behind the lens 32a. The image pickup device 32b is a compound eye type device. The image pickup device 32b receives reflected light (photographing light), which is reflected backward by an obstacle located in front of the camera unit 30 and passes through the lens 32a. The upper portion of the camera unit 30 is engaged with the bracket 20 and is supported by the bracket 20. Noted that, a thermistor 30a (see FIG. 9), which can detect the temperature Tc of the camera unit 30, is provided inside the camera unit 30.

The light shielding and heating unit 40 shown in FIGS. 4 to 8 (particularly, FIG. 5) is provided with a light shielding hood 41, a double-faced adhesive tape 42, a heater module 43, a fuse module 44, a heat insulator 45 and a cable module 46 as main components.

The light shielding hood 41 is an integrally molded product made from a hard resin. The light shielding hood 41 includes a heated portion 41a and side wall portions 41b. The heated portion 41a is a plate having an equilateral triangular shape (that is, the heated portion 41a has an equilateral triangular shape in the front view). The heated portion 41a is bilaterally symmetrical with respect to the center line L1 extending in the front-rear direction. The side wall portions 41b are a pair of flange portions extending upward from left and right side edge portions of the heated portion 41a, respectively. The height of each side wall portion 41b gradually increases from the front end thereof to the rear end thereof.

The heater module 43 includes a PET sheet 43a and a heater 43b.

The PET sheet 43a is made from PET (polyethylene terephthalate). The outer shape of the PET sheet 43a is substantially the same shape as that of the heated portion 41a. That is, the PET sheet 43a is an equilateral triangle bilaterally symmetrical with respect to the center line L1. The PET sheet 43a has good insulating property.

The heater 43b is a heating wire made from a metal (for example, brass) that generates heat when receiving electricity. The heater 43b is formed on substantially the entire upper surface of the PET sheet 43a by printing in a zig-zag manner. Both end portions of the heater 43b are constituted by a pair of lands 43c and 43d having larger area than the other portions of the heater 43b. The lands 43c, 43d are exposed on the upper and lower surfaces of the PET sheet 43a. The land 43c is provided in the vicinity of the rear corner of the PET sheet 43a, and the land 43d is provided in the vicinity of front right corner of the PET sheet 43a.

The lower surface of the double-faced adhesive tape 42 is attached to the upper surface of the PET sheet 43a so as to cover the heater 43b. The double-faced adhesive tape 42 has substantially the same shape as the heated portion 41a and the PET sheet 43a. The upper surface of the double-faced adhesive tape 42 is attached to the lower surface of the heated portion 41a. As a result, the heater module 43 is fixed to the light shielding hood 41. The double-faced adhesive tape 42 has good thermal conductivity. The peripheral edge portion of the PET sheet 43a overlaps the peripheral edge portions of the double-faced adhesive tape 42 and the heated portion 41a.

The fuse module 44 is integrally provided with a double-faced adhesive tape 44a, a fuse 44b and two lead wires 44c, 44d.

Figure 5:
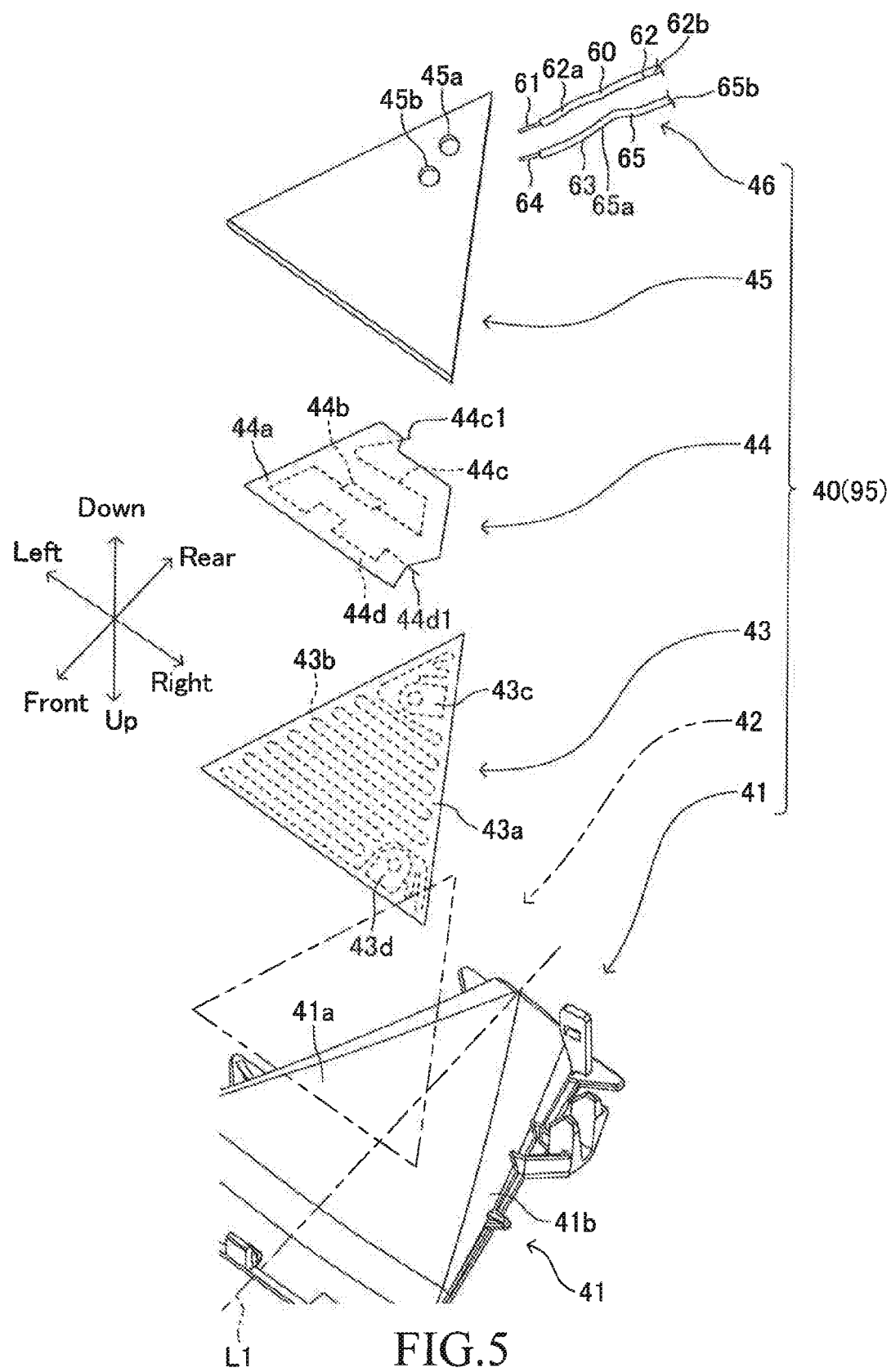
FIG. 5 is an exploded perspective view of a light shielding and heating unit as viewed from the below.

The double-faced adhesive tape 44a is a sheet-like member having a shape shown in FIG. 5, and both surfaces of the double-faced adhesive tape 44a are adhesive surfaces. The thermal conductivity of the double-faced adhesive tape 44a is lower than those of the light shielding hood 41, the double-faced adhesive tape 42, and the PET sheet 43a.

The fuse 44b is a current limiting element, and includes a cylindrical insulating case and a soluble metal which has conductivity. The soluble metal is provided inside the insulating case and is fixed to the insulating case. The insulating case of the fuse 44b is attached to the substantially central portion of the upper surface of the double-faced adhesive tape 44a.

The two lead wires 44c, 44d are attached to the upper surface of the double-faced adhesive tape 44a in the illustrated manner. One end of each of the two lead wires 44c, 44d is located in the insulating case of the fuse 44b. The one end of the lead wire 44c is connected to one end of the soluble metal, and the one end of the lead wire 44d is connected to the other end of the soluble metal. On the other hand, connecting ends 44c1, 44d1, which are the other ends of the two lead wires 44c, 44d, are both located on the outer peripheral side with respect to the double-faced adhesive tape 44a.

Figure 7:
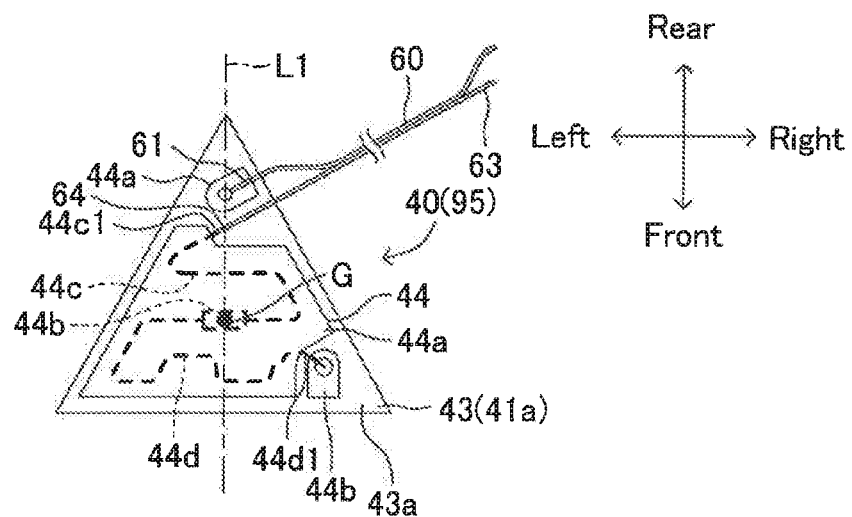
FIG. 7 is a schematic view of a heated portion, a heater module, a fuse module, and a cable module as viewed from the below.

The upper surface of the double-faced adhesive tape 44a is attached to the lower surface of the PET sheet 43a. As a result, the fuse module 44 is fixed to the heater module 43. As shown in FIG. 7, the entire fuse module 44 is located on the inner peripheral side with respect to the outer peripheral edge portion of the PET sheet 43a. The pair of the lands 43c, 43d of the heater module 43 are located on the outer peripheral side with respect to the double-faced adhesive tape 44a. Furthermore, as shown in FIG. 7, the fuse 44b of the fuse module 44 is located at a position overlapping the position of the center of gravity G of the heated portion 41a in the thickness direction of the heated portion 41a. That is, the fuse 44b is arranged on a straight line, which extends in the thickness direction of the heated portion 41a and passes through the center of gravity G.

The fuse 44b and the lead wires 44c, 44d (except for the connecting ends 44c1, 44d1) are in contact with the lower surface of the PET sheet 43a. That is, the fuse 44b and the lead wires 44c, 44d (except for the connecting ends 44c1, 44d1) and the portion of the heater 43b excluding the lands 43c, 43d are insulated from each other by the PET sheet 43a positioned therebetween. Further, the connecting end 44d1 of the lead wire 44d is soldered to the lower surface of the land 43d of the PET sheet 43a (not shown).

The heat insulator 45 shown in FIG. 5 is made from an insulating material, and has substantially the same shape as the heated portion 41a. That is, the heat insulator 45 is an equilateral triangular sheet-like member. A pair of through-holes 45a, 45b are formed in the vicinity of the rear end corner of the heat insulator 45. The thermal conductivity of the heat insulator 45 is lower than those of the light shielding hood 41, the double-faced adhesive tape 42, the PET sheet 43a, and the double-faced adhesive tape 44a.

The upper surface of the heat insulator 45 is attached to the lower surface of the double-faced adhesive tape 44a. A portion of the upper surface of the heat insulator 45, which does not face the double-faced adhesive tape 44a, is in contact with the lower surface of the PET sheet 43a. The peripheral portion of the heat insulator 45 is in contact with a portion of the light shielding hood 41 which is positioned on the outer peripheral side with respect to the peripheral portions of the heated portion 41a and the PET sheet 43a. In addition, the through-holes 45a, 45b of the heat insulator 45 are located on the center line L1 when viewed in the thickness direction of the heated portion 41a. When the heat insulator 45 is fixed to the double-faced adhesive tape 44a, the through-hole 45a is located immediately below the land 43c of the PET sheet 43a and the through-hole 45b is located immediately below the connecting end 44c1 of the lead wire 44c.

Figure 6:
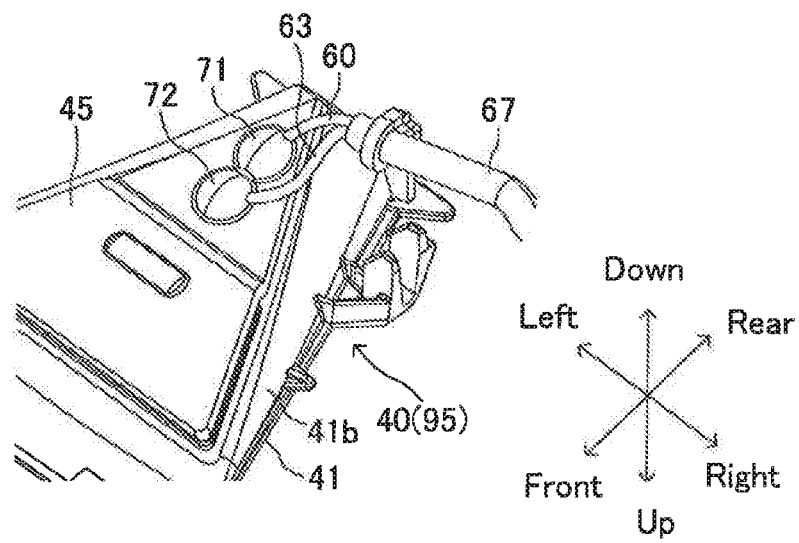
FIG. 6 is a perspective view of the light shielding and heating unit as viewed from the below.

As shown in FIGS. 5 to 9, the cable module 46 is provided with a first electric cable 60, a second electric cable 63, a connector 66 (see FIGS. 4 and 9) connected to one end of the first electric cable 60 and one end of the second electric cable 63, and a banding tube 67 (see FIG. 6).

The first electric cable 60 includes an electric wire 61 made of a metal wire having good conductivity and a covering tube 62 covering the outer peripheral surface of the electric wire 61 excluding the outer peripheral surface of both end portions thereof. Similarly, the second electric cable 63 includes an electric wire 64 made of a metal wire having good conductivity and a covering tube 65 covering the outer peripheral surface of the electric wire 64 excluding the outer peripheral surface of both end portions thereof.

Two metallic contacts (not shown) are provided inside the connector 66. One of the two contacts is an anode and the other of the two contacts is a cathode. One end of the first electric cable 60 and one end of the second electric cable 63 are connected to the connector 66. One end of the electric wire 61 is connected to one contact which is the anode and one end of the electric wire 64 is connected to the other contact which is the cathode.

Further, as shown in FIGS. 4 and 6, portions of the covering tube 62 and the covering tube 65, which are different from the front and rear end portions thereof, are inserted into the single banding tube 67. That is, the banding tube 67 bundles the covering tube 62 and the covering tube 65 so as not to separate from each other.

Figure 8A:
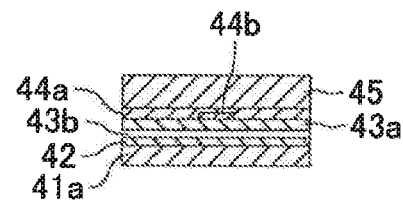
FIG. 8a is a cross-sectional view of the light shielding and heating unit when being cut at a position passing through the fuse.
Figure 8B:
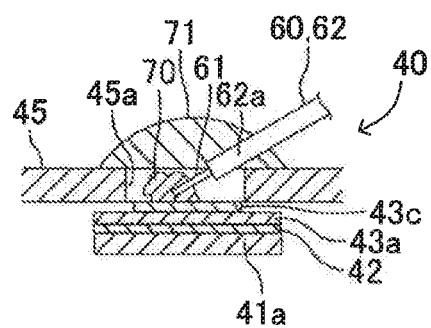
FIG. 8b is a cross-sectional view of the light shielding and heating unit when being cut at a position passing through a sealant.

As shown in FIG. 8B, the other end of the electric wire 61 of the first electric cable 60 is inserted into the through-hole 45a of the heat insulator 45, and the other end of the electric wire 61 is connected to the lower surface of the land 43c by a solder 70. Although illustration is omitted, the other end of the electric wire 64 of the second electric cable 63 is inserted into the through-hole 45b of the heat insulator 45. The other end of the electric wire 64 and the connecting end 44c1 of the lead wire 44c are soldered to each other.

As shown in FIGS. 6, 8A, and 8B, a sealant 71 having electrical insulation property is fixed to the lower surface of the heat insulator 45 and a fixed portion 62a (shown in FIGS. 5 and 8B) that is the vicinity of the through-hole 45a side end of the covering tube 62 of the first electric cable 60. The through-hole 45a is covered with this sealant 71. Similarly, as shown in FIG. 6, a sealant 72 having electrical insulation property is fixed to the lower surface of the heat insulator 45 and a fixed portion 65a (shown in FIG. 5) that is the vicinity of the through-hole 45b side end of the covering tube 65 of the second electric cable 63. The through-hole 45b is covered with this sealant 72.

As shown in FIGS. 3 and 4, the light shielding hood 41 of the light shielding and heating unit 40 is fitted into the hood mounting recess 31a of the camera unit 30, and the front portion of the image pickup unit 32 is located directly above the rear end portion of the heated portion 41a through a gap between the rear end portions of the left and right side wall portions 41b. Further, as shown in FIGS. 2 and 3, the light shielding hood 41 of the light shielding and heating unit 40 is fitted into the support portion 21 of the bracket 20, and the upper surface of the cover 50 is fixed to the bracket 20 so as to cover the camera unit 30 and the light shielding and heating unit 40.

The connector 66 of the cable module 46 is drawn backward of the cover 50 through the rear end opening of the cover 50.

As shown in FIGS. 1 and 2, the photographing apparatus 10, which is integrated in this way, is fixed to the vehicle interior side surface of the forward extending portion 86a of the light shielding sheet 86 by using adhesive (not shown) applied to each adhesive surface 22 of the bracket 20. Then, the support portion 21 of the bracket 20, the heated portion 41a of the light shielding and heating unit 40, and the image pickup unit 32 of the camera unit 30 are positioned at positions facing the light transmission hole 86b of the light shielding sheet 86. Accordingly, photographing light, which is directed from the front side of the front window 85 to the rear side of the front window 85 and passes through the light transmission portion 85a and the light transmission hole 86b of the light shielding sheet 86 backward, is received by the image pickup device 32b after passing through the lens 32a of the image pickup unit 32.

Figure 9:
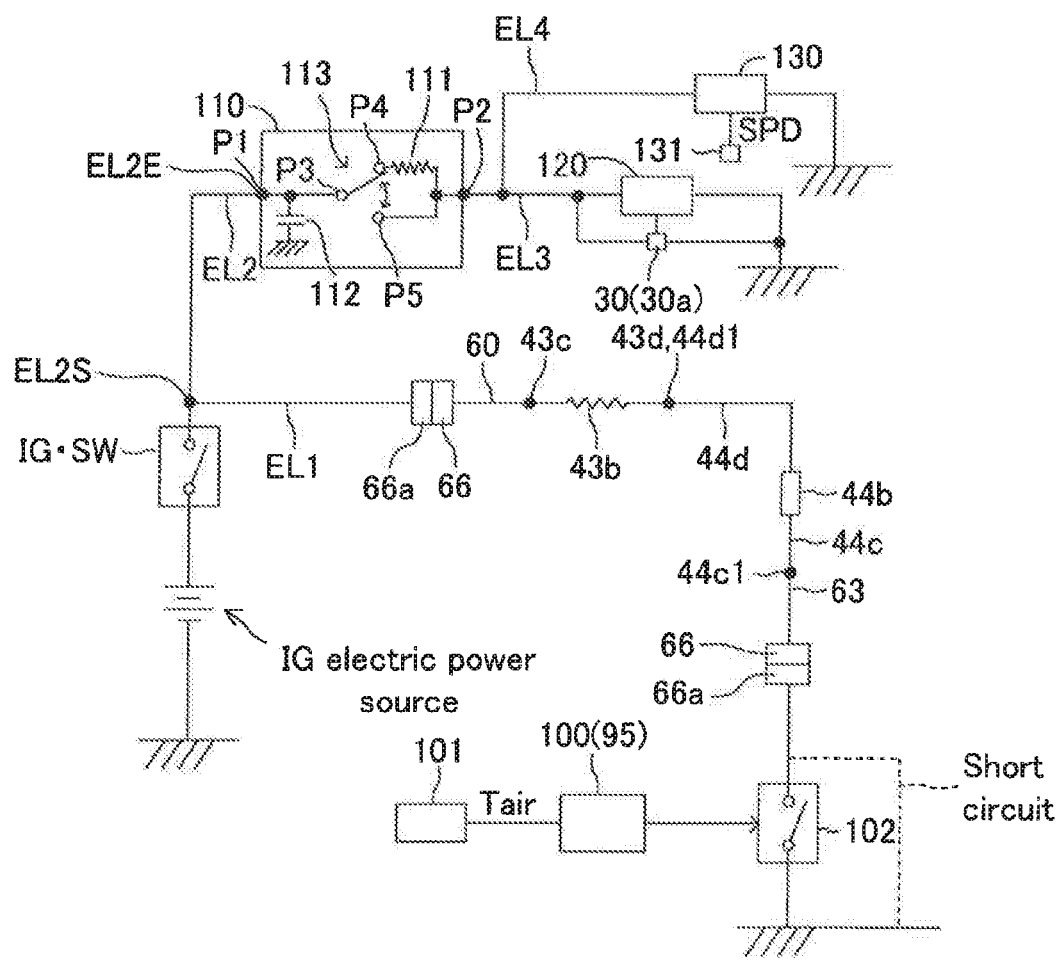
FIG. 9 is a schematic view of an electrical circuit.

As shown in FIG. 9, the vehicle is provide with an electric control device (not shown, hereinafter referred to as "control device") 100. The control device 100 is an ECU. ECU is an abbreviation of Electric Control Unit, and is provided with a microcomputer including a CPU and a storage device such as a ROM and a RAM. The CPU implements various functions by executing instructions (programs) stored in the ROM. A "low speed duty ratio calculation map (MapLo)" and a "high speed duty ratio calculation map (MapHi)" are stored in the storage device (ROM) of the control device 100.

Further, the vehicle is provided with an outside air temperature sensor 101, a switch element 102, a relay element 110, a camera control ECU 120, a brake control ECU 130, a vehicle speed sensor 131, and etc. The control device 100, the camera control ECU 120, and the brake control ECU 130 are capable of transmitting and receiving information (signals) to each other via a CAN (not shown).

The outside air temperature sensor 101 is provided in a front grill of the vehicle, and detects a temperature Tair outside of the vehicle. The outside air temperature sensor 101 is connected to the control device 100.

The switch element 102 is a semiconductor switch element. The state of the switch element 102 is switched between an ON state (conduction state or connection state) and an OFF state (nonconduction state or disconnection state) by the control device 100. The switch element 102 may be a relay type switch.

The connector 66 of the light shielding and heating unit 40 is connected to a vehicle body side connector 66a provided in the vehicle body. Actually, the connector 66 and the vehicle body side connector 66a are integrated members. However, in FIG. 9, the connector 66 and the vehicle body side connector 66a are drawn in a manner that the connector 66 and the vehicle body side connector 66a are divided into two pieces in order to be easy to understand the connection relation.

The first electric cable 60 is connected to an anode of a vehicle installation electric power source (i.e., an IG electric power source or battery) via the connector 66, the vehicle body side connector 66a, an electrical supply line EL1, and an ignition switch (IG·SW). A cathode of the IG electric power source is grounded. The second electric cable 63 is connected to one end of the switch element 102 via the connector 66 and the vehicle body side connector 66a. The other end of the switch element 102 is grounded.

Therefore, when the switch element 102 is in the OFF state, electricity of the IG electric power source is not supplied to the heater 43b, so that the heater 43b does not generate heat. When the switch element 102 is in the ON state, electricity of the IG electric power source is supplied to the heater 43b, so that the heater 43b generates heat.

One end EL2S of an electrical supply line EL2 is connected to the ignition switch (IG·SW). The other end EL2E of the electrical supply line EL2 is connected to an input terminal P1 of a relay element 110. An output terminal P2 of the relay element 110 is connected to one end of an electrical supply line EL3 and one end of an electrical supply line EL4.

A power supply line (not shown) of the camera control ECU 120 is connected to the other end of the electrical supply line EL3. An earth line (not shown) of the camera control ECU 120 is grounded. As a result, the camera control ECU 120 is supplied with electricity from the IG electric power source via the relay element 110. In addition, a power supply line (not shown) of the camera unit 30 is connected to the other end of the electrical supply line EL3, and an earth line (not shown) of the camera unit 30 is grounded. As a result, the camera unit 30 is supplied with electricity from the IG electric power source via the relay element 110. The camera control ECU 120 and the camera unit 30 are connected to each other so as to be capable of transmitting and receiving various signals therebetween.

A power supply line (not shown) of the brake control ECU 130 is connected to the other end of the electrical supply line EL4. An earth line (not shown) of the brake control ECU 130 is grounded. As a result, the brake control ECU 130 is supplied with electricity from the IG electric power source via the relay element 110. The brake control ECU 130 is connected to a brake device (not shown) of the vehicle, and controls a braking force of the vehicle using the brake device.

The vehicle speed sensor 131 generates a signal corresponding to the speed SPD of the vehicle. The vehicle speed sensor 131 is connected to the brake control ECU 130. The brake control ECU 130 detects (acquires) the vehicle speed SPD based on the signal received from the vehicle speed sensor 131.

A power supply line (not shown) of the control device 100 is connected to the electrical supply line EL1. However, a power supply line (not shown) of the control device 100 may be connected to the output terminal P2 of the relay element 110. An earth line (not shown) of the control device 100 is grounded. As a result, the control device 100 is supplied with electricity from the IG electric power source.

The relay element 110 includes a resistor 111, a capacitor 112, and a switching portion 113.

One end of the resistor 111 is connected to a terminal P4 of the switching portion 113. The other end of the resistor 11 is connected to the output terminal P2.

One polar plate of the capacitor 112 is connected to the input terminal P1 and the terminal P3 of the switching portion 113. The other polar plate of the capacitor 112 is grounded. Therefore, while the ignition switch (IG·SW) is closed, the capacitor 112 is charged by the IG electric power source. The terminal P3 is connected to the input terminal P1. A terminal P5 is connected to the output terminal P2.

Based on a signal from the control device 100, the switching portion 113 selectively realizes either a state (a first state) in which the terminal P3 and the terminal P4 are connected to each other or a state (a second state) in which the terminal P3 and the terminal P5 are connected to each other.

By the way, the control device 100 performs a start-and-stop control (hereinafter referred to as SS control) that automatically operates and stops an internal combustion engine (not shown) mounted on the vehicle according to the driving state of the vehicle.

The control device 100 sets the switching portion 113 to the first state (the state where the terminal P3 is connected to the terminal P4) when the internal combustion engine is operating. Therefore, in this case, electricity supplied from the IG electric power source is supplied to "the camera control ECU 120 and the camera unit 30" via the ignition switch (IG·SW), the electrical supply line EL2, the resistor 111 and the electrical supply line EL3. Similarly, electricity supplied from the IG electric power source is supplied to the brake control ECU 130 via the ignition switch (IG·SW), the electrical supply line EL2, the resistor 111 and the electrical supply line EL4.

When the operation of the internal combustion engine is stopped by the SS control, an alternator which is driven by the internal combustion engine stops generating power. Therefore, when the operation of the internal combustion engine is stopped, the voltage of the IG electric power source becomes lower than when the internal combustion engine is operating. Furthermore, when the internal combustion engine, which is in a stopped state, is restarted by the SS control, a starter motor rotates using electricity supplied from the IG electric power source. Therefore, while the internal combustion engine is restarted, the voltage of the IG electric power source is further lower than when the operation of the internal combustion engine is stopped. As described above, when the control device 100 performs the SS control, the voltage of the IG electric power source tends to be lowered, so that the operation of the camera unit 30 tends to become unstable.

Therefore, when the internal combustion engine is stopped or the operation of the internal combustion engine is automatically started by the SS control, the control device 100 sets the switching portion 113 to the second state (the state where the terminal P3 is connected to the terminal P5). Therefore, in this case, electricity stored in the capacitor 112 is supplied to "the camera control ECU 120 and the camera unit 30" via the electrical supply line EL2 and the electrical supply line EL3. Similarly, electricity stored in the capacitor 112 is supplied to the brake control ECU 130 via the electrical supply line EL2 and the electrical supply line EL4. As a result, even if the voltage of the IG power source is lowered, high voltage electricity is supplied from the capacitor 112 to the camera control ECU 120, the camera unit 30, the brake control ECU 130, etc. via the output terminal P2.

Incidentally, as will be described later, when the voltage of the electrical supply line EL1 (i.e., the voltage Vh (the heater voltage Vh) which is substantially equal to the voltage of the IG electric power source and is applied to the heater 43b) changes, the heat generation amount of the heater 43b changes. Therefore, it is necessary to estimate the heater voltage Vh. On the other hand, in the present embodiment, it is difficult to provide a voltage measuring device in the electrical supply line EL1 due to the configuration of the electrical circuit. Therefore, it is impossible to directly measure the heater voltage Vh.

On the other hand, the camera control ECU 120 is configured to be capable of detecting a voltage Vc of electricity supplied to the camera control ECU 120 (potential of the electrical supply line EL3). Therefore, based on the voltage Vc, the camera control ECU 120 estimates the heater voltage Vh (in particular, potential of the electrical supply line EL1 when the switch element 102 is in the ON state) by calculation. Then, the control device 100 receives the estimated heater voltage Vh from the camera control ECU 120 through communication, and executes energization control of the heater 43b based on the received heater voltage Vh.

The voltage measured by the camera control ECU 120 is defined as Vc, the voltage drop amount caused by the resistor 111 when the switching portion 113 connects the terminal P3 to the terminal P4 (i.e., when the switching portion 113 is in the first state) is defined as Vr, and the voltage of the IG electric power source is defined as Vp. In this case, as shown in the following equation, the voltage Vp of the electric power source is equal to the sum of the voltage Vc and the voltage drop amount Vr.

$$Vp=Vc+Vr$$

The voltage drop amount Vr is the product of the resistance value of the resistor 111 and the value of current flowing through the resistor 111. When the current value of the camera control ECU 120 (the electrical supply line EL3) and the current value of the brake control ECU 130 (the electrical supply line EL4) are added, the added value is the current value of the resistor 111. Therefore, when the current value of the electrical supply line EL3 and the current value of the electrical supply line EL4 can be detected, the voltage drop amount Vr can be calculated.

In the present embodiment, the camera control ECU 120 can detect the current value of the electricity supplied to the camera control ECU 120, however, the brake control ECU 130 cannot measure the current value of the electricity supplied to the brake control ECU 130. However, the electrical circuit of the present embodiment is designed so that the sum of the current value of the electrical supply line EL3 and the current value of the electrical supply line EL4 (i.e., the current value of the resistor 111) dose not exceed a predetermined maximum current value Imax regardless of the magnitude of the voltage of the IG electric power source. In other words, the camera control ECU 120, the camera unit 30, and the brake control ECU 130 are designed so that value of current flowing through the camera control ECU 120, value of current flowing through the camera unit 30, and value of current flowing through the brake control ECU 130 do not exceed their respective maximum current values. The sum of these maximum current values does not exceed the maximum current value Imax.

Therefore, the maximum current value Imax is stored in the ROM of the camera control ECU 120. Then, the camera control ECU 120 calculates the maximum value Vrmax of the voltage drop amount Vr as the product of the resistance value of the resistor 111 and the maximum current value Imax (i.e., the resistance value of the resistor 111 times (x) the maximum current value Imax), and calculates the voltage Vp of the IG electric power source (=the voltage Vc+the maximum value Vrmax) by adding the maximum value Vrmax and the voltage Vc.

Since the maximum current value Imax of this embodiment is 0.5 A (ampere) and the resistance value of the resistor 111 is 1.0Ω, the camera control ECU 120 calculates the voltage Vp as a value higher than the voltage Vc by 0.5 V (=the maximum value Vrmax). However, since the actual current value of the resistor 111 is equal to or less than the maximum current value Imax, the actual voltage of the IG electric power source (i.e., the actual value of the heater voltage Vh) can be lower than the estimated voltage Vp (=the voltage Vc+the maximum value Vrmax) by 0.5 V at the maximum. In other words, there may be a difference between the actual heater voltage Vh and the estimated voltage Vp. However, since the maximum current value Imax is a small value (0.5 A), this difference is a small value.

Furthermore, when the switching portion 113 connects the terminal P3 to the terminal P5 (i.e., when the switching portion 113 is in the second state), the camera control ECU 120 regards the voltage Vc measured by the camera control ECU 120 as the voltage Vp (=Vh). However, in this case, as will be understood from the explanation on the SS control described above, the actual voltage of the IG electric power source (i.e., the heater voltage Vh) is likely to be lower than the voltage Vc. That is, regardless of whether the switching portion 113 is in the first state or in the second state, the estimated voltage Vp becomes a value higher than the actual heater voltage.

The light shielding and heating unit 40 and the control device 100 described above are components of the heating device 95.

(Operation)

Next, the operations of the vehicle and the photographing apparatus 10 will be described. When an ignition key (not shown) is operated, the ignition switch (IG·SW) is closed and thus the anode of the IG electric power source is made to be connected to the electrical supply line EL1, the electrical supply line EL2, and the control device 100. As a result, the camera control ECU 120 causes the camera unit 30 to start imaging. The camera unit 30 acquires imaging data using the image pickup unit 32 each time a predetermined period of time elapses.

More specifically, the image pickup device 32b of the image pickup unit 32 captures reflected light, which is reflected backward by an object (for example, another vehicle) positioned in front of the vehicle having the photographing apparatus 10 and passes through the light transmission portion 85a of the front window 85, the light transmission hole 86b of the light shielding sheet 86, and the lens 32a, to generate imaging data. The camera unit 30 transmits the imaging data to the camera control ECU 120. The camera control ECU 120 processes the imaging data received from the camera unit 30, and transmits it to the control device 100 each time a predetermined period of time elapses. By analyzing the received imaging data, the control device 100 acquires information (forward information) on an object (other vehicle, obstacle, etc.) existing in front of the vehicle, and controls the vehicle based on the forward information.

For example, based on the forward information, the control device 100 executes "automatic brake control, lane keeping assist control (i.e., lane tracing assist control), adaptive high beam control" and the like, executes automatic operation, and issues an alarm. Hereinafter, such a control based on forward information is referred to as driving support control.

Furthermore, when electricity is supplied to each of the ECUs, the ECUs execute the following operations described below every time a predetermined period of time elapses.

The control device 100 detects the outside air temperature Tair using the outside air temperature sensor 101.

The camera control ECU 120 detects the temperature Tc of the camera unit 30 using the thermistor 30a. The camera control ECU 120 detects a voltage Vc of electricity supplied to the camera control ECU 120 (potential of the electrical supply line EL3), and estimates the heater voltage Vh as described above.

The brake control ECU 130 detects the vehicle speed SPD using the vehicle speed sensor 131.

These detected values are transmitted to the control device 100.

Meanwhile, when the outside air temperature (i.e., air temperature outside of the vehicle) is low, dew condensation may occur on the light transmission portion 85a of the front window 85. Dew condensation is easy to occur when an air heating device is used in the passenger compartment. Furthermore, when the outside air temperature is low, ice and/or frost may adhere to the light transmission portion 85a. If such a phenomenon occurs, the imaging data generated by the image pickup device 32b may be data representing a blurred object image, and/or the image pickup unit 32 may fail to image an object in front of the vehicle. In such a case, the control device 100 may fail to accurately perform the above-described driving support control using imaging data. Thus, the control device 100 prevents such a situation from occurring by executing the processing (routine) shown by the flowchart of FIG. 10. It should be noted that the control device 100 sets the switch element 102 to the OFF state immediately after the ignition key switch is changed from an OFF position to an ON position.

The CPU of the control device 100 (hereinafter simply referred to as "CPU") starts the processing of the routine shown in FIG. 10 from Step 1000 every time a predetermined period of time T (see FIG. 11. It is set to 3 minutes in the present embodiment.) elapses, and thereafter proceeds to Step 1001. Then, the CPU determines whether or not the outside air temperature Tair detected by the outside air temperature sensor 101 at a predetermined time tp immediately before the start of the processing of this routine is lower than a predetermined outside air temperature threshold Tath. When the outside air temperature Tair is equal to or higher than the predetermined outside air temperature threshold Tath, "a possibility that dew condensation occurs on the light transmission portion 85a" and "a possibility that ice and/or frost adhere to the light transmission portion 85a" are extremely low. Therefore, in this case, the CPU determines "No" in Step 1001, and proceeds to Step 1006 to set the switch element 102 to the OFF state (i.e., to stop supplying electricity to the heater 43b). Thereafter, the CPU directly proceeds to Step 1095 and temporarily ends this routine. As a result, the state of the switch element 102 is maintained in the OFF state, so that the heater 43b does not generate heat.

On the other hand, when the outside air temperature Tair is lower than the predetermined outside air temperature threshold Tath, the CPU determines "Yes" in Step 1001, and proceeds to Step 1002 to determine whether or not the vehicle speed SPD detected by the vehicle speed sensor 131 at the predetermined time tp immediately before the start of the processing of this routine is equal to or higher than a predetermined speed threshold SPDth. The control device 100 executes the driving support control based on the imaging data generated by the camera unit 30 when the vehicle speed SPD is equal to or higher than the speed threshold SPDth. Therefore, when the vehicle speed SPD is less than the speed threshold SPDth, the imaging data is not used, so it is not necessary to energize the heater 43b. Therefore, when the vehicle speed SPD is less than the speed threshold SPDth, the CPU determines "No" in Step 1002, and directly proceeds to Step 1095 via Step 1006. As a result, the switch element 102 is maintained in the OFF state, so that the heater 43b does not generate heat.

On the other hand, when the vehicle speed SPD is equal to or higher than the speed threshold SPDth, the CPU determines "Yes" in Step 1002 and proceeds to Step 1003. Noted that, Step 1002 can be omitted. In other words, the speed threshold SPDth can be "0 km/h". In this case, the CPU inevitably proceeds to Step 1003 regardless of the vehicle speed SPD. In Step 1003, the CPU determines whether or not the temperature Tc of the camera unit 30 detected by the thermistor 30a at the predetermined time tp immediately before the start of the processing of this routine is within a predetermined normal temperature range (i.e., a temperature range in which the operation of the camera unit 30 is guaranteed). When the temperature Tc of the camera unit 30 is not within the normal temperature range, the CPU determines "No" in Step 1003, and proceeds directly to Step 1095 via Step 1006. As a result, since the switch element 102 is maintained in the OFF state, the heater 43b does not generate heat.

On the other hand, when the temperature Tc of the camera unit 30 is within the normal temperature range, the CPU determines "Yes" in Step 1003, and proceeds to Step 1095 to end this routine temporarily after executing the processing of Steps 1004 and 1005 described below in that order. When the CPU determines "Yes" in all of Steps 1001 to 1003, a predetermined control start condition is satisfied.

Step 1004: First, the CPU determines whether the vehicle speed SPD detected by the vehicle speed sensor 131 at the predetermined time tp is included in a predetermined low speed area or in a predetermined high speed area. For example, the range of the low speed area can be set to 0 km/h or more and less than 50 km/h, and the range of the high speed area can be set to 50 km/h or more.

When the vehicle speed SPD is a vehicle speed included in the low speed area, the CPU selects the low speed duty ratio calculation map (MapLo) as a duty ratio calculation map (lookup table). Then, as shown in the following formula, the CPU calculates the duty ratio by applying "the heater voltage Vh, the outside air temperature Tair and the vehicle speed SPD" at the predetermined time tp to this map as arguments. The heater voltage Vh is a voltage which is estimated by the camera control ECU 120 based on the voltage Vc of electricity supplied to the camera control ECU 120 (potential of the electrical supply line EL3).

Duty ratio=MaPLo($Vh$, $Tair$, SPD)

Figure 11:
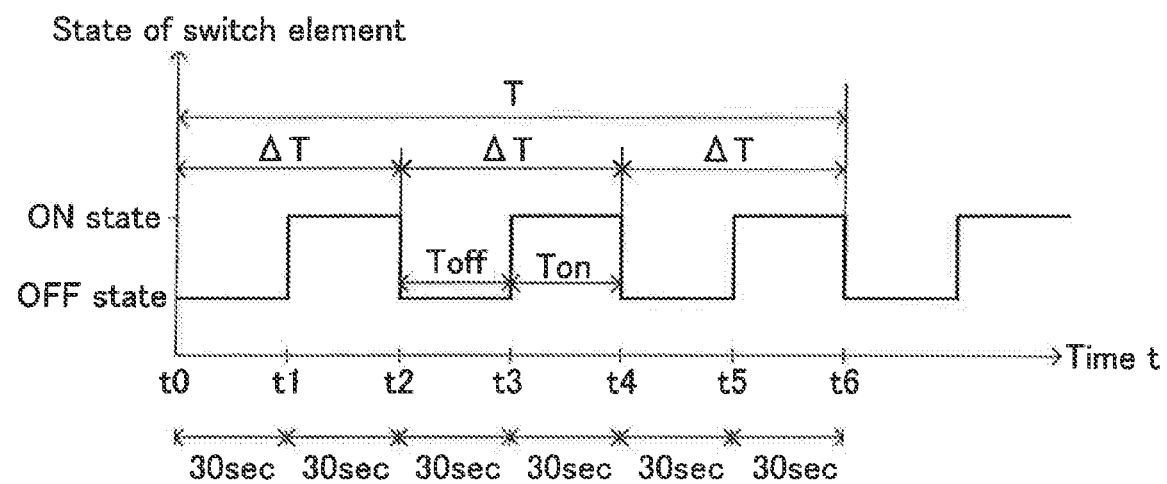
FIG. 11 is a graph showing a duty ratio when electricity is supplied to a heater.

As shown in FIG. 11, the duty ratio is a ratio (%) expressed by the following formula. Here, the period of time (voltage application time) during which the switch element 102 is in the ON state is defined as Ton, and the period of time (voltage application stop time) during which the switch element 102 is in the OFF state is defined as Toff. Noted that, in this embodiment, assuming Ton+Toff=one cycle $\Delta T$, the predetermined period of time T is set to be three times as long as $\Delta T$ (i.e., T=3·$\Delta T$). The larger the duty ratio becomes, the larger electric energy supplied to the heater 43b (i.e., electric energy consumed by the heater 43b) for the predetermined period of time T (i.e., total electric energy) becomes, and thus the heat generation amount of the heater 43b for the predetermined period of time T (i.e., total heat generation amount [J]) becomes larger.

Duty ratio=[Ton/(Ton+Toff)]·100(%)

On the other hand, when the vehicle speed SPD is a vehicle speed included in the high speed area, the CPU selects the high speed duty ratio calculation map (MapHi) as the duty ratio calculation map. Then, as shown in the following formula, the CPU calculates the duty ratio by applying "the heater voltage Vh, the outside air temperature Tair and the vehicle speed SPD" to this map as arguments. The heater voltage Vh is a voltage which is estimated by the camera control ECU 120 based on the voltage Vc of electricity supplied to the camera control ECU 120 (potential of the electrical supply line EL3) as described above.

Duty ratio=MaPHi(Vh,Tair,SPD)

According to an experiment, it was found that when the temperature of the heater 43b is maintained within a predetermined temperature range (hereinafter referred to as "an appropriate temperature range"), "the occurrence of dew condensation on the light transmission portion 85a and the adherence of ice and frost etc to the light transmission portion 85a" can be avoided. Noted that when the temperature of the heater 43b is maintained within the appropriate temperature range, the temperature of the light transmission portion 85a can be maintained at "temperature within the predetermined range which is equal to or higher than the dew point temperature". It is assumed that this is the reason why the occurrence of dew condensation and the adherence of ice and frost can be avoided.

On the other hand, the temperature of the heater 43b has a strong correlation with the heat generation amount generated by the heater 43b and the amount of heat escaping from the heater 43b for a predetermined period of time (i.e., the predetermined period of time T of this embodiment). Furthermore, the amount of heat escaping from the heater 43b has a strong correlation with a heat radiation amount of the light transmission portion 85a. The heat radiation amount of the light transmission portion 85a for a predetermined period of time has a strong correlation with "the outside air temperature Tair and the vehicle speed SPD". Therefore, "the heater voltage Vh at the predetermined time tp, the outside air temperature Tair at the predetermined time tp and the vehicle speed SPD at the predetermined time tp" are used as arguments of the low speed duty ratio calculation map (MapLo) and the high speed duty ratio calculation map (MapHi).

The low speed duty ratio calculation map (MapLo) and the high speed duty ratio calculation map (MapHi) may be integrated into one duty ratio calculation map (MapCo (Vh, Tair, SPD)). Hereinafter, when there is no need to distinguish the low speed duty ratio calculation map (MapLo) and the high speed duty ratio calculation map (MapHi), these maps are called a duty ratio calculation map. A duty ratio calculated in accordance with the duty ratio calculation map is a value corresponding to a target value of "the heat generation amount (supplied electric energy) of the heater 43b for the predetermined period of time T" which is necessary for maintaining the temperature of the heater 43b within the appropriate temperature range. Therefore, the duty ratio calculation map is obtained (made) based on a relationship between the three factors (i.e., the heater voltage Vh, the outside air temperature Tair, the vehicle speed SPD) and the duty ratio necessary for maintaining the temperature of the heater 43b within the appropriate temperature range (a target value of the total heat generation amount to be generated by the heater 43b for the predetermined period of time T), and is stored in the ROM. This relationship is obtained in advance by an experiment.

Noted that, the target heat generation amount (the target value of the heat generation amount) can be calculated based on the outside air temperature Tair and the vehicle speed SPD, and the duty ratio can be calculated based on the target heat generation amount and the heater voltage Vh.

The duty ratio becomes smaller as the heater voltage Vh becomes higher, regardless of whether the low speed duty ratio calculation map (MapLo) or the high speed duty ratio calculation map (MapHi) is used.

The duty ratio becomes smaller as the outside air temperature Tair becomes higher, regardless of whether the low speed duty ratio calculation map (MapLo) or the high speed duty ratio calculation map (MapHi) is used.

When the heater voltage Vh and the outside air temperature Tair are predetermined constant values respectively, the duty ratio obtained by the high speed duty ratio calculation map (MapHi) is larger than the duty ratio obtained by the low speed duty ratio calculation map (MapLo). Furthermore, the duty ratio becomes larger as the vehicle speed SPD becomes higher, regardless of whether the low speed duty ratio calculation map (MapLo) or the high speed duty ratio calculation map (MapHi) is used.

Step 1005: The CPU executes the energization control (heat generation amount control) of the heater 43b over the predetermined period of time T according to the duty ratio. That is, as shown in FIG. 11, the CPU repeats a switching operation three times (see the times t0 to t6 in FIG. 11). In each of the switching operations, the CPU sets the switch element 102 to the OFF state over the voltage application stop time Toff defined by the duty ratio, and then sets the switch element 102 to the ON state over the voltage application time Ton defined by the duty ratio. Thereafter, the CPU restarts this routine from Step 1000 when the predetermined period of time T elapses from the time at which the processing of Step 1001 is started.

In this way, as the voltage Vp of the electric power source (the voltage Vh of the heater 43b) at the predetermined time tp becomes higher, the total time of the voltage application time Ton in the predetermined period of time T becomes shorter. Furthermore, when the predetermined period of time T is set to a time period which is not so long, an actual fluctuation range of the voltage of the electric power source in the predetermined period of time T is not so large. In addition, the camera control ECU 120 calculates the voltage Vp (=Vh) in consideration of the voltage drop amount Vr. Therefore, regardless of the magnitude of the voltage Vp (=Vh) at the predetermined time tp, the heat generation amount generated by the heater 43b from the time t0 to the time t6 becomes a value substantially equal to the heat generation amount determined at the time t0. Furthermore, as described above, the estimated voltage Vp (=Vh) is estimated as a value higher than the actual voltage of the electric power source regardless of whether the state of the switching portion 113 is in the first state or in the second state. Therefore, the heat generation amount of the heater 43b does not greatly exceed the heat generation amount determined at the time t0 in the predetermined time T.

As a result, the photographing apparatus for vehicle according to the present embodiment can maintain the temperature of the heater 43b within the appropriate temperature range even when the voltage of the electric power source changes. As a result, the photographing apparatus for vehicle can reduce the possibility of "the occurrence of dew condensation on the light transmission portion 85a and the adherence of ice and frost etc to the light transmission portion 85*a*", and can reduce the possibility that the temperature of the heater 43*b* becomes excessively high temperature which considerably exceeds the appropriate temperature range. Therefore, it is possible to reduce the possibility of thermal deformation of a component (for example, the PET sheet 43*a*) located in the vicinity of the heater 43*b*.

In the case where the electrical circuit does not include the fuse 44*b*, when a short circuit (ground fault) occurs in the electrical circuit in the "short circuit" manner of FIG. 9, electricity of the IG electric power source is supplied to the heater 43*b* even when the control device 100 sets the switch element 102 to the OFF state. That is, in this case, the electricity of the IG electric power source is continuously supplied to the heater 43*b* for a long time. Therefore, the heater 43*b*, the heated portion 41*a*, and the peripheral portion thereof become excessively hot.

However, the photographing apparatus 10 of the present embodiment is provided with the fuse 44*b* provided on the electrical circuit. The soluble metal of the fuse 44*b* is heated by the heat transmitted from the heater 43*b* via the lead wires 44*c*, 44*d* and the heat transmitted from the heated portion 41*a*.

When a short circuit occurs in the electrical circuit in the "short circuit" manner in FIG. 9, the heater 43*b* and the heated portion 41*a* become high temperature. Then, the temperature of the fuse 44*b* becomes a temperature equal to or more than a predetermined value, and thus the fuse 44*b* is blown (melted). Then, since the electricity of the IG electric power source fails to be supplied to the heater 43*b*, the heater 43*b*, the heated portion 41*a*, and the peripheral portion thereof are prevented from becoming excessively hot.

Modified Embodiment

Figure 10:
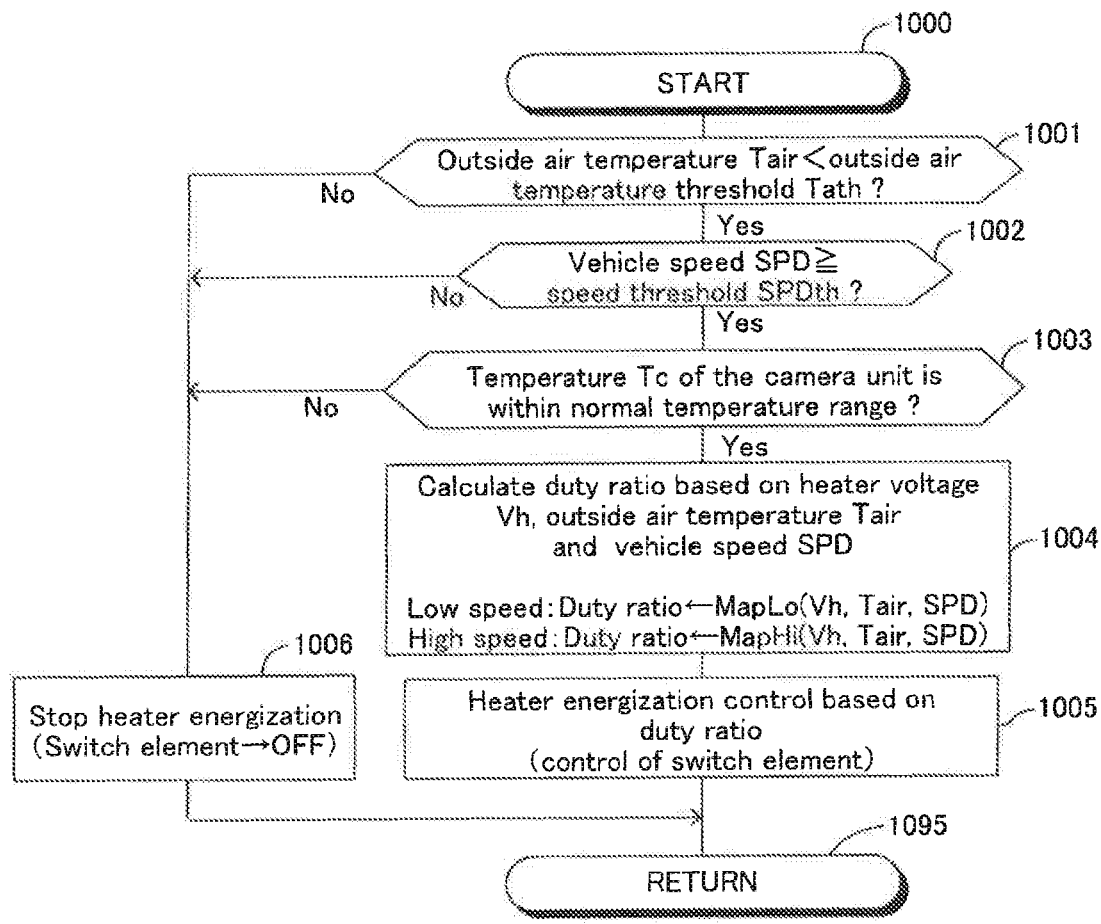
FIG. 10 is a routine showing processing executed by a control device.
Figure 12:
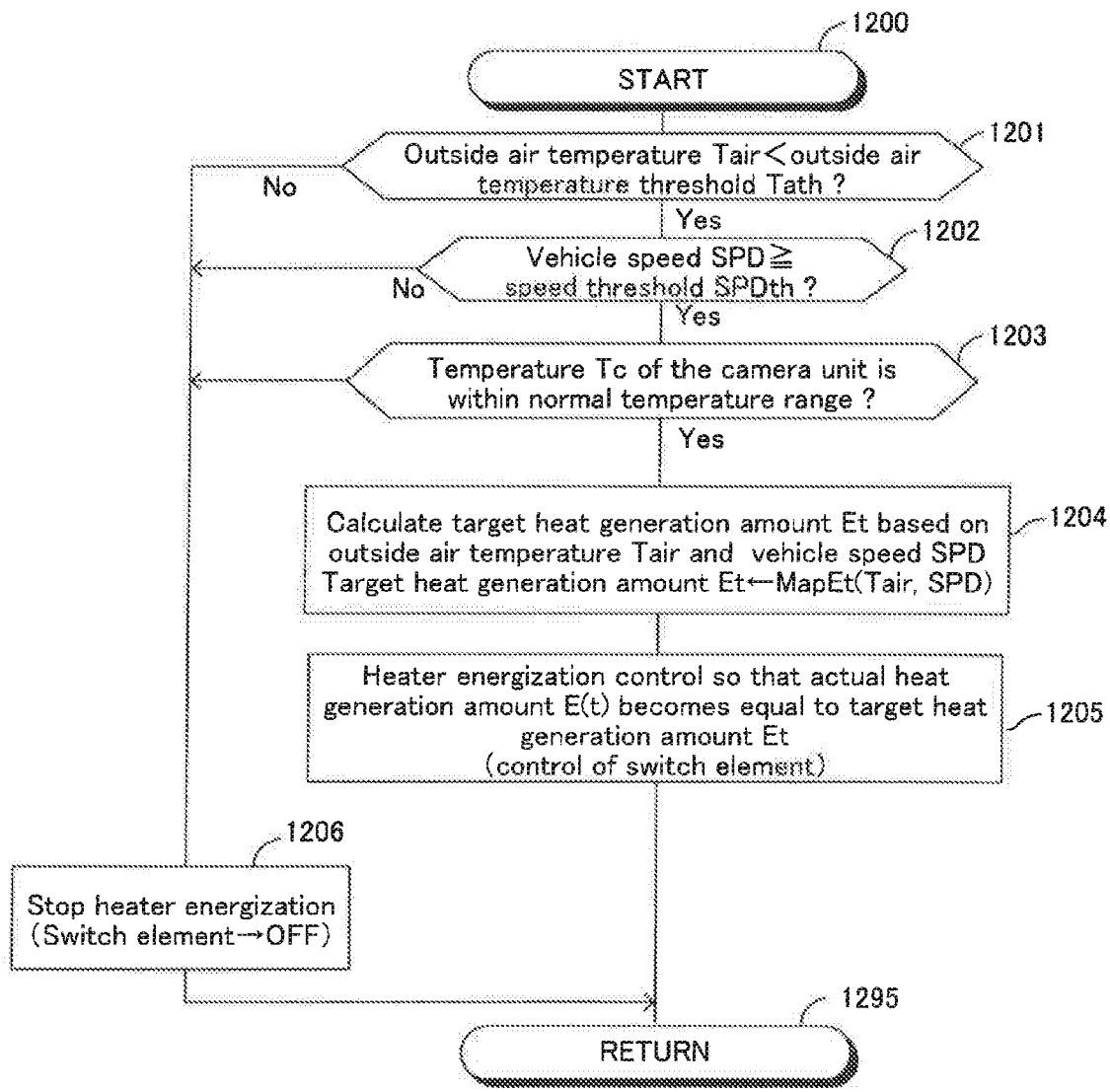
FIG. 12 is a routine showing processing executed by the control device according to a modified embodiment of the present invention.

For example, the CPU of the control device 100 according to the modified embodiment of the present invention may execute the routine shown by the flowchart of FIG. 12 every time the predetermined period of time T elapses instead of the flowchart of FIG. 10. Steps 1201, 1202, 1203 and 1206 of this flowchart are the same as Steps 1001, 1002, 1003 and 1006, respectively. Therefore, descriptions about these Steps are omitted.

When the CPU determines "Yes" in Step 1203, the CPU executes the processing in Steps 1204 and 1205 described below.

Step 1204: As shown in the following formula, the CPU applies "the outside air temperature Tair and the vehicle speed SPD" at the predetermined time tp to a target heat generation amount calculation map (look-up table) MaPEt stored in the ROM of the control device 100 as arguments to calculate a target heat generation amount Et. The target heat generation amount Et is a target value of "the heat generation amount of the heater 43*b* (i.e., supplied electric energy) for the predetermined period of time T" which is necessary for maintaining the temperature of the heater 43*b* within the appropriate temperature range.

Target heat generation amount *Et*=MaP*Et*(*Tair,SPD*)

Step 1205: The CPU executes energization control (heat generation amount control) of the heater 43*b* according to the target heat generation amount Et. More specifically, the CPU changes the switch element 102 from the OFF state to the ON state, thereby supplying electricity of the IG electric power source to the heater 43*b* to cause the heater 43*b* to generate heat. Further, the CPU calculates an actual heat generation amount (total heat amount, integrated value of heat amount) E(t) generated actually by the heater 43*b* from the time at which the switch element 102 is changed to the ON state based on the following formula (1). Noted that, "t" is time, "R" is the resistance value of the heater 43*b*, and "V" is the voltage of the heater 43*b*. The above-mentioned "the heater voltage Vh which is estimated by the camera control ECU 120 based on the voltage Vc of the electricity supplied to the camera control ECU 120" is used as "V".

$$E(t) = \frac{1}{R}\int_0^t V^2(t)dt \qquad \text{[Formula (1)]}$$

Further, in Step 1205, the CPU monitors whether or not the actual heat generation amount E(t) calculated based on the formula (1) reaches (i.e., becomes equal to or higher than) the target heat generation amount Et, and changes the switch element 102 from the ON state to the OFF state when the actual heat generation amount E(t) reaches the target heat generation amount Et. Thereafter, when the predetermined period of time T elapses from the time at which the processing of Step 1201 is started, the CPU restarts this routine from Step 1200.

Although the present invention has been described based on the embodiment and modified embodiment, the present invention is not limited to the above-described embodiment and modified embodiment, and various modifications can be made without departing from the object of the present invention.

In the above-described embodiment and the modified embodiment, instead of using the look-up tables, the duty ratio and the target heat generation amount Et may be calculated by using formulas having the arguments of the look-up tables as variables.

The heater voltage Vh used in Step 1004 of FIG. 10 may be the voltage at the time immediately after the switch element 102 is switched from the OFF state to the ON state. In other words, the CPU may switch the switch element 102 from the OFF state to the ON state at time t0 in FIG. 11 and determine the duty ratio immediately thereafter.

Furthermore, in a modified embodiment of the present invention, the control device 100 may be configured so that the potential (voltage) of the electrical supply line EL1 can be detected as the heater voltage Vh.

Additionally, the photographing apparatus for the vehicle may be mounted to a window different from a front window. For example, a photographing apparatus for vehicle may be mounted to a back window of a vehicle so that an obstacle located behind the vehicle can be detected by this photographing apparatus for vehicle.

The target heat generation amount (Et) may be calculated based only on the outside air temperature Tair.

What is claimed is:

1. A photographing apparatus for a vehicle comprising a photographing apparatus, a camera control unit, a heating means, and a control device, wherein:
the photographing apparatus is disposed inside a vehicle so as to face a window of the vehicle and is configured to receive photographing light passing through the window;
the camera control unit is supplied with electricity from an electric power source of the vehicle, is connected to the photographing apparatus so as to be capable of transmitting and receiving signals from the photographing apparatus, and is configured to detect a voltage Vc applied from the electric power source to the photographing apparatus;

the heating means is disposed inside the vehicle so as to face the window, the heating means generating heat that is given to the window when voltage of the electric power source is applied to the heating means; and the control device is configured to change a voltage application time that is a time period for applying the voltage of the electric power source to the heating means so that a total amount of heat generated by the heating means for a predetermined period of time is coincident with a predetermined amount determined based at least on an outside air temperature and an estimated voltage value that is an estimated value of the voltage of the electric power source, and wherein, the camera control unit is configured to obtain, by calculation, the estimated voltage value based on a magnitude of the detected voltage Vc and a maximum value Vrmax of a voltage drop amount that can occur between the electric power source and the photographing apparatus, and the control device is configured to receive the estimated voltage value from the camera control unit and change the voltage application time that is the time period for applying the voltage of the electric power source to the heating means based on the received estimated voltage value and the outside air temperature.

2. The photographing apparatus for a vehicle according to claim 1, wherein, the control device is configured to make the voltage application time shorter as the received estimated voltage value becomes higher.

3. The photographing apparatus for a vehicle according to claim 1, further comprising:

an outside air temperature detector detecting the outside air temperature that is a temperature outside the vehicle; and a vehicle speed sensor detecting a vehicle speed that is a speed of the vehicle, wherein, the control device is configured to:

calculate a total amount of heat generated by the heating means from when the electric power source starts applying the voltage to the heating means based on the received estimated voltage value; and stop applying the voltage of the electric power source to the heating means when the calculated total amount of heat reaches a target heat generation amount that is determined based on the detected outside air temperature and the detected vehicle speed.

4. A heating device disposed inside a vehicle so as to face a window of the vehicle together with a photographing apparatus, the heating device comprising:

a heating means generating heat that is given to the window when voltage of an electric power source of the vehicle is applied to the heating means; and a control device changing a voltage application time that is a time period for applying the voltage of the electric power source to the heating means so that a total amount of heat generated by the heating means for a predetermined period of time is coincident with a predetermined amount determined based at least on an outside air temperature and an estimated voltage value that is an estimated value of the voltage of the electric power source, wherein the control device is configured to receive the estimated voltage value from a camera control unit that is supplied with electricity from the electric power source, is connected to the photographing apparatus so as to be capable of transmitting signals to and receiving signals from the photographing apparatus, is configured to detect a voltage Vc applied from the electric power source to the photographing apparatus, and is configured to obtain, by calculation, the estimated voltage value based on a magnitude of the detected voltage Vc and a maximum value Vrmax of a voltage drop amount that can occur between the electric power source and the photographing apparatus.

* * * * *